J. T. THORNTON.
Thrashing Machine.
No. 85,974.
Patented Jan. 19, 1869.
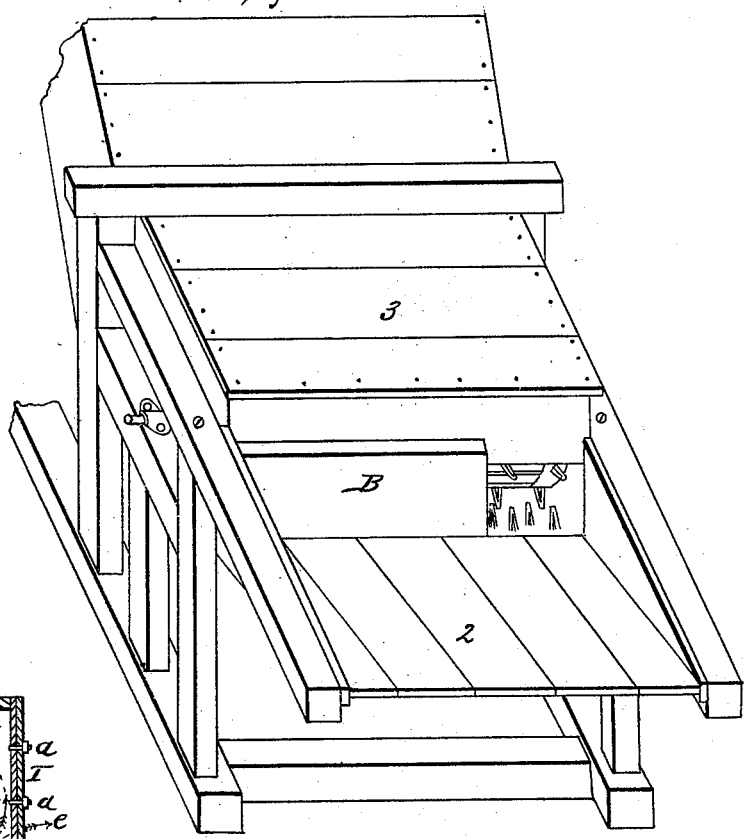
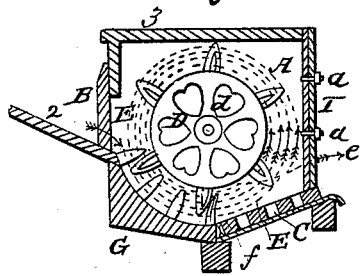
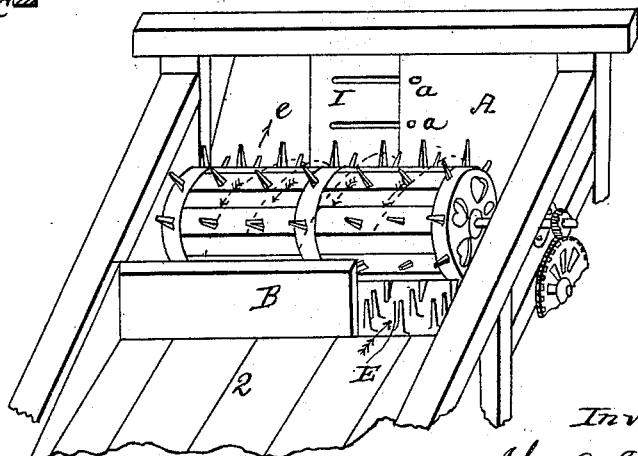
Witnesses
F. A. Atwater
O. D. Bassett
Inventor
John T. Thornton

JOHN T. THORNTON, OF ELMIRA, ILLINOIS.

Letters Patent No. 85,974, dated January 19, 1869; antedated January 6, 1869.

IMPROVEMENT IN THRESHING-MACHINE.

The Schedule referred to in these Letters Patent and making part of the same.

*To all whom it may concern:*

Be it known that I, JOHN T. THORNTON, of Elmira, in the State of Illinois, have invented a new and improved Mode of Hulling Clover with a Threshing-Machine; and I do hereby declare that the following is a full and exact description thereof, reference being made and had to the accompanying drawings, and to the letters of reference marked thereon.

The nature of my invention consists in providing certain stoppages to a threshing-machine, as will prevent clover-hay from passing immediately around and off from its cylinder, and cause it to pass around said cylinder a thousand times or more before it is allowed to escape on the opposite side from its entrance, and thereby completely threshing the seed from the heads or hulls, and doing it quicker and better than any of the clover-hulling machines now in use.

To enable others skilled in the use of the threshing-machine to apply and use my invention, I will proceed to describe its construction and operation.

I make use of any common threshing-machine, and apply a piece of thin board, large enough to close two-thirds of the entrance to the cylinder from the feed-table 2, as shown by letter B in the accompanying drawing, Nos. 1 and 2, and only allowing the one-third opening at one end of said entrance, for the clover to pass to the cylinder.

I also apply a piece of thin board or sheet-iron under and back of the cylinder, entirely closing the aperture under the back half of the cylinder, as shown in drawing No. 3, letter C, and thereby causing the seed to pass out at the opening left by the sliding slide I, in Figure 2.

I also apply a double or sliding slide, made either of copper, brass, or sheet-iron, to close or partially close the opening in the rear of the cylinder, as shown in drawing No. 2, letters A and I, to be opened by sliding, more or less, as occasion may require, according to the condition of the hay, and left open enough to allow the seed to pass out at the opposite end of the cylinder from its entrance, as shown by letter *e* in fig. 2.

The above-named attachments confine the hay to the cylinder long enough to completely thresh out its seed, which is the principle of my invention.

What I claim as my invention, and desire to secure by Letters Patent, is—

The application, to a common threshing-machine, of three certain attachments, which will enable said threshing-machine to thresh or hull clover equally well or better than regular clover-hulling machines, which are very expensive, and useful for no other purpose.

JOHN T. THORNTON.

Witnesses:
   ALBINUS NANCE,
   J. B. WILSON.